US007237711B2

(12) United States Patent
Manthei

(10) Patent No.: US 7,237,711 B2
(45) Date of Patent: Jul. 3, 2007

(54) APPARATUS CONFIGURED FOR ILLUMINATING PAPER-BASED FORMS OF PAYMENT AND CASH REGISTER COMPRISING SAME

(76) Inventor: Donald James Manthei, P.O. Box 2991, Kalamazoo, MI (US) 49003

( * ) Notice: Subject to any disclaimer, the term of this patent is extended or adjusted under 35 U.S.C. 154(b) by 42 days.

(21) Appl. No.: 10/973,967

(22) Filed: Oct. 26, 2004

(65) Prior Publication Data

US 2006/0086795 A1 Apr. 27, 2006

(51) Int. Cl.

*G06F 17/00* (2006.01)
*G06K 15/00* (2006.01)
*G06K 7/10* (2006.01)
*G06K 7/14* (2006.01)
*G02B 27/02* (2006.01)

(52) U.S. Cl. ...................... 235/375; 235/378; 235/454; 40/367; 250/556; 356/71; 108/23; 362/276; 362/802

(58) Field of Classification Search ................ 235/375, 235/454, 378; 250/556; 40/367; 356/71; 108/23; 362/276, 802

See application file for complete search history.

(56) References Cited

U.S. PATENT DOCUMENTS 425,538 A * 4/1890 Du Vivier .................... 202/262
3,618,765 A * 11/1971 Cooper et al. .............. 209/534
4,071,883 A * 1/1978 Dennis ........................ 362/97
4,464,786 A * 8/1984 Nishito et al. .............. 382/135
4,480,177 A * 10/1984 Allen ......................... 235/379
4,941,687 A 7/1990 Crane
4,980,569 A * 12/1990 Crane et al. ................ 250/556
5,059,949 A 10/1991 Caparoni et al.
5,217,293 A * 6/1993 Kobzeff ....................... 362/97
5,260,582 A * 11/1993 Danek et al. ............... 250/556
5,308,992 A * 5/1994 Crane et al. ................ 250/556
5,399,874 A * 3/1995 Gonsalves et al. .......... 250/556
5,434,427 A * 7/1995 Crane et al. ................ 250/556
5,468,971 A * 11/1995 Ebstein et al. .............. 250/556
5,607,040 A * 3/1997 Mathurin, Sr. .............. 194/207
5,613,712 A 3/1997 Jeffers
D394,667 S * 5/1998 Romano .................... D16/135
5,756,977 A * 5/1998 Biss ........................... 235/7 R
5,877,852 A * 3/1999 Schilbach et al. ............ 356/71
5,915,518 A * 6/1999 Hopwood et al. .......... 194/207

(Continued)

FOREIGN PATENT DOCUMENTS

DE 004404872 A1 * 8/1995

*Primary Examiner*—Daniel Walsh
(74) *Attorney, Agent, or Firm*—Raymond M. Galasso; Galasso & Associates, LP

(57) ABSTRACT

An illumination device comprises a housing, a light source, a light transmissive support plate and a sensor. The light source is mounted within a cavity of the housing. The light transmissive support plate is engaged with the housing. The housing and the light source are configured for enabling light from the light source to impinge upon the light transmissive support plate. The sensor is configured for selectively activating the light source dependent upon placement of an article relative to the light transmissive support plate. In one embodiment, the sensor is preferably a force sensitive sensor having the light transmissive support plate engaged therewith. The light transmissive support plate is mounted in a manner enabling force to be applied on the force sensitive sensor by the light transmissive support plate when a corresponding force is applied on a support surface of the light transmissive support plate.

4 Claims, 4 Drawing Sheets

U.S. PATENT DOCUMENTS

| | | | | |
|---|---|---|---|---|
| 5,918,960 | A * | 7/1999 | Hopwood et al. | 356/71 |
| 5,942,759 | A * | 8/1999 | Romano | 250/461.1 |
| 6,075,587 | A * | 6/2000 | Shiau | 356/71 |
| 6,603,871 | B2 * | 8/2003 | Liang | 382/135 |
| 6,637,577 | B2 * | 10/2003 | Ouyang et al. | 194/328 |
| 6,858,856 | B2 * | 2/2005 | Balog et al. | 250/556 |
| 6,994,201 | B2 * | 2/2006 | Yu et al. | 194/207 |
| 2003/0048633 | A1 * | 3/2003 | Shiau et al. | 362/109 |
| 2003/0098350 | A1 * | 5/2003 | Liou et al. | 235/462.25 |
| 2003/0103198 | A1 * | 6/2003 | Yu | 356/71 |
| 2003/0164398 | A1 * | 9/2003 | Walker et al. | 235/375 |
| 2004/0079906 | A1 * | 4/2004 | Balog et al. | 250/556 |
| 2004/0094729 | A1 * | 5/2004 | Struye et al. | 250/581 |
| 2005/0213078 | A1 * | 9/2005 | Grob et al. | 356/71 |
| 2005/0283403 | A1 * | 12/2005 | Ramirez et al. | 705/16 |
| 2006/0070412 | A1 * | 4/2006 | Wiseman | 70/88 |
| 2006/0086795 | A1 * | 4/2006 | Manthei | 235/454 |
| 2006/0131416 | A1 * | 6/2006 | Jwo | 235/454 |

* cited by examiner

APPARATUS CONFIGURED FOR ILLUMINATING PAPER-BASED FORMS OF PAYMENT AND CASH REGISTER COMPRISING SAME

FIELD OF THE DISCLOSURE

The disclosures made herein relate generally to currency anti-counterfeiting measures and, more particularly, to equipment and methods configured for facilitating visual identification of security measures in paper-based forms of payment.

BACKGROUND

In order to allow entities such as, for example, financial institutions, merchants and law enforcement agencies to determine whether various forms of paper-based payment are or are not counterfeit, such forms of paper payment often have built-in security devices. Examples of such paper-based payment forms include paper currency, checks, money orders, cashier's checks, traveller checks and the like. Individual units of paper currency are generally referred to as bills (e.g., $10 bills).

One example of a security measure is a specific ink composition used to print indicia on paper-based forms of payment. Proprietary inks, which are made by government entities or only available to government entities, are often used in printing paper currency. Another example of a security measure is an item that is integrated into or attached to the paper from which a paper-based form of payment is made and that is best viewed with light passing through the paper. Specific examples of such an item include an article designating information such as a denomination of a particular bill, an originating country of a particular bill, etc. In certain denominations of United States paper currency, a thread (e.g., a plastic strip) is embedded in the paper and glows green when exposed to ultraviolet light. Still another example of a security measure is microprinting of indicia on the paper currency, which is viewable only with a magnification device. Yet another example of a security measure is a watermark (i.e., a faint image) that is formed in the paper and that is best viewed with light passing through the paper.

Checking for security measures in paper-based forms of payment can be time-consuming and less than convenient. For example, checking for security measures that are best identified with light passing through the particular paper based-form of payment is often difficult when preferred light sources are inaccessible or in convenient to access. Additionally, some security measures require a particular type of light (e.g., ultraviolet light) and/or a particular intensity of light. Absent these conditions, it may be difficult to authenticate even legitimate paper-based forms of payment. However, even in view of such inconveniences, time-consuming practices and special requirements, it is in a business's best interest to examine any currency it receives because it typically assumes the loss for any counterfeit forms of payment that it accepts.

Therefore, apparatuses that overcome drawbacks and limitations associated with conventional approaches for visually identifying security measures in paper-based forms of payment would be useful, advantageous and novel.

SUMMARY OF THE DISCLOSURE

In one embodiment, an illumination device comprises a housing, a light source, a light transmissive support plate and a sensor configured for selectively activating the light source. The light source is mounted within a cavity of the housing. The light transmissive support plate is engaged with the housing. The housing and the first light source are configured for enabling light from the light source to impinge upon the light transmissive support plate. The sensor is configured for selectively activating the light source dependent upon placement of an article relative to the light transmissive support plate.

In another embodiment, an apparatus for enabling authentication of a paper-based form of payment comprises an illumination device and an interface unit. The illumination device includes a housing, a light source mounted within a cavity of the housing and a light transmissive support plate engaged with the housing. The housing and the light source are configured for enabling light from the light source to impinge upon the light transmissive support plate. The interface unit is coupled to the light source of the illumination device and is configured for activating the light source in response to at least one of determining when a prescribed event of a sales transaction processing unit has been performed and receiving a signal designating that the prescribed event of the sales transaction processing unit has been performed.

In another embodiment, a sales system comprises an illumination device and a sales transaction processing unit. The illumination device includes a housing, a light source mounted within the housing and a light transmissive support plate engaged with the housing. The housing and the light source are configured for enabling light to impinge upon the light transmissive support plate. The sales transaction processing unit is coupled to the illumination device and includes a means for activating the light source of the illumination device in response to at least one of determining when a prescribed event of the sales transaction processing unit has been performed and receiving a signal designating that the prescribed event of the sales transaction processing unit has been performed.

Correspondingly, it is a principal object of the inventive disclosures made herein to provide for devices, apparatuses, methods and/or systems that overcome drawbacks and limitations associated with conventional approaches for visually identifying security measures in paper-based forms of payment that are best viewed with a relatively high volume of light passing through the paper. Advantageously, such devices, apparatuses, methods and/or systems provide a convenient and simple means for allowing a person to determine whether or not a paper-based form of payment is counterfeit. A simple, reliable and convenient means of identifying paper-based forms of payment that are counterfeit is desirable as a business or person typically assumes the loss for any counterfeit forms of payment that it accepts.

Turning now to specific embodiments of the inventive disclosures made herein, in at least one embodiment of the inventive disclosures made herein, a plurality of light sources are provided within the cavity of the housing, thereby enhancing uniformity of light distribution through the light transmissive support plate.

In at least one embodiment of the inventive disclosures made herein, the sensor is a force sensitive sensor, the light transmissive support plate is engaged with the force sensitive sensor and the light transmissive support plate is mounted in a manner enabling force to be applied on the force sensitive sensor by the light transmissive support plate when a corresponding force is applied on a support surface of the light transmissive support plate.

In at least one embodiment of the inventive disclosures made herein, the prescribed event that triggers activation of the light source or sources is opening of a payment drawer of a sales transaction processing unit and a sensor is provided for determining a relative position of the payment drawer.

These and other objects and embodiments of the inventive disclosures made herein will become readily apparent upon further review of the following specification and associated drawings.

DETAILED DESCRIPTION OF THE DRAWINGS

Figure 1:
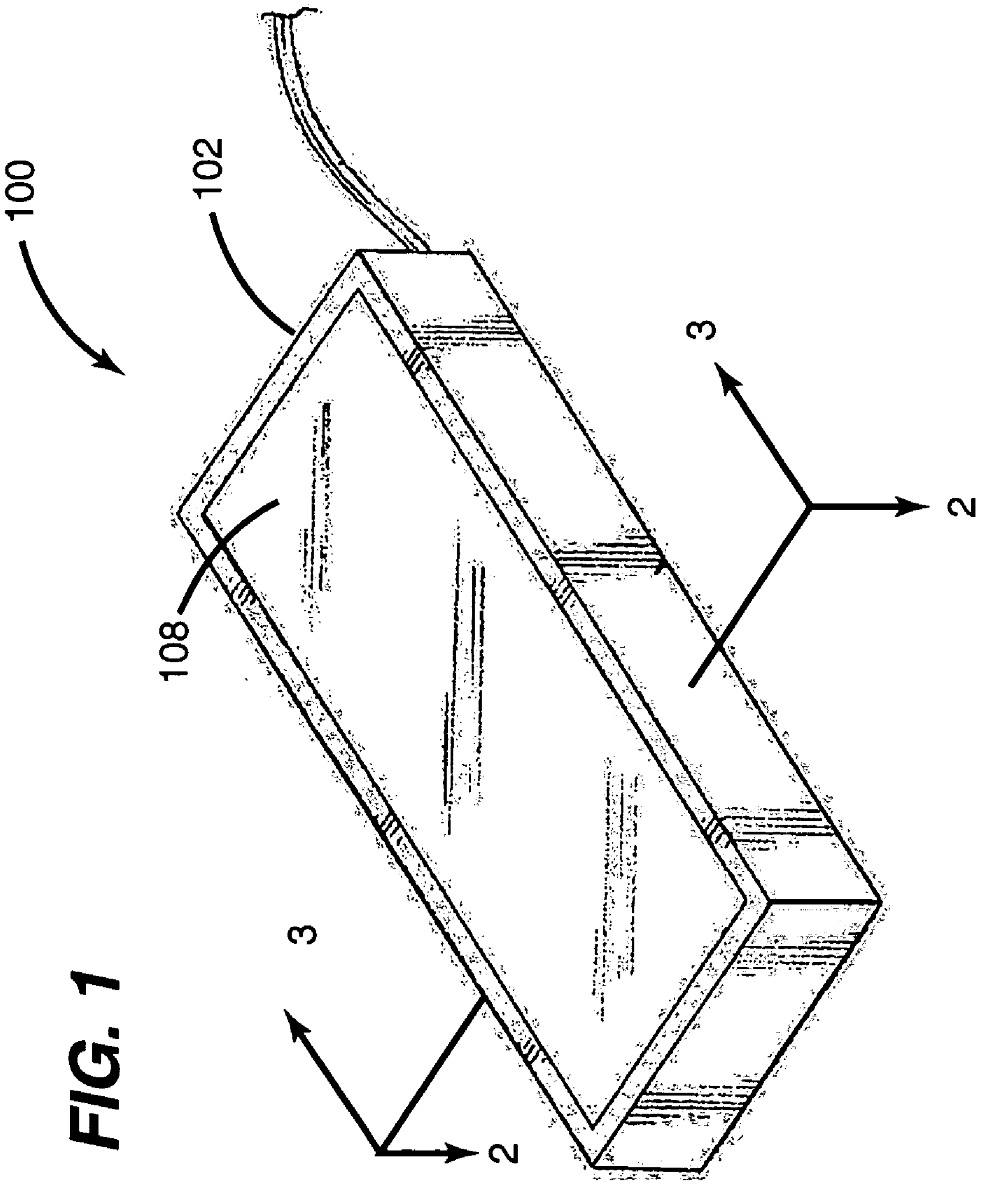
FIGS. 1–3 depict an embodiment of an illumination device in accordance with the inventive disclosures made herein.
Figure 2:
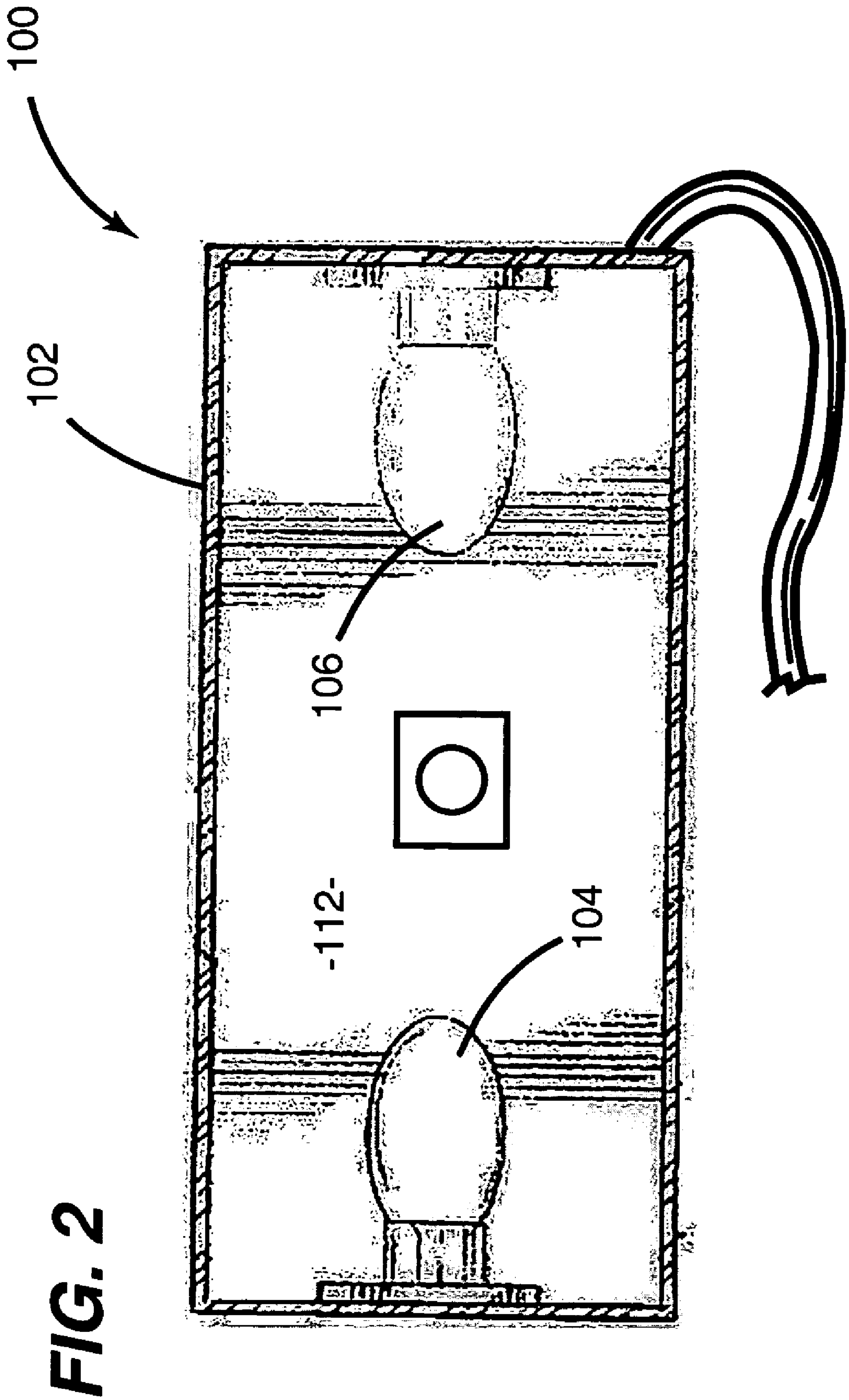
Figure 3:
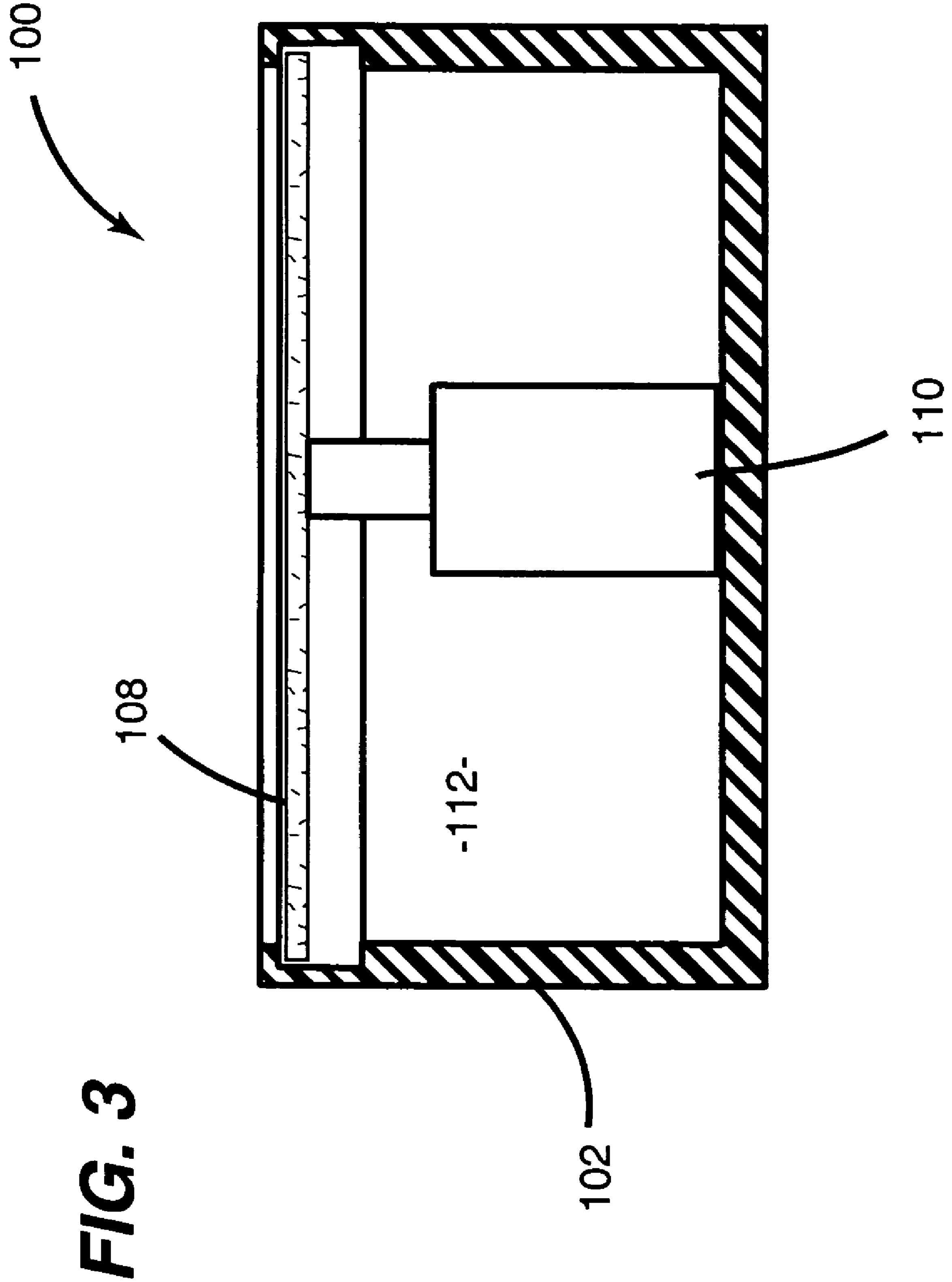

FIGS. 1–3 depict an embodiment of an illumination device 100 in accordance with the inventive disclosures made herein. The illumination device 100 includes a housing 102, a first light source 104, a second light source 106, a light transmissive support plate 108, and a sensor 110. The first light source 104 and the second light source 106 (e.g., commercially available light bulbs and fixtures) are mounted within a cavity 112 of the housing 102. The light transmissive support plate 108 (e.g., made from glass or plastic) is engaged with (e.g., mounted on or attached to) the housing 102. The housing 102 and the light sources (104, 106) are configured for enabling light from the light sources (104, 106) to impinge upon the light transmissive support plate 108. The sensor 110 is configured for selectively activating the light sources (104, 106) dependent upon placement of an article relative to the light transmissive support plate 108.

A preferred utility of the illuminating device 100 is illuminating paper-based forms of payment for enhancing visual identification of security measures in such paper-based forms of payment. Examples of such paper-based forms of payment include, but are not limited to, paper currency, checks, money orders, cashier's checks and traveller checks. Examples of such security measures include, but are not limited to, discrete items that are integrated into or attached to the paper from which the paper-based from of payment is made and images formed in and/or on the paper from which the paper-based from of payment is made. For example, in certain denominations of United States paper currency, a watermark is formed in the paper and/or a thread (e.g., a plastic strip) that glows green when exposed to ultraviolet light is embedded in the paper.

In operation, a paper-based form of payment is placed on the light transmissive support plate 108. The sensor 110 senses such placement of the paper-based form of payment and facilitates activation of (i.e., turns on) the light sources (104, 106). In doing so, light from the light sources (104, 106) passes through the light transmissive support plate 108 and, accordingly, through the paper of the paper-based form of payment. Transmission of light through the paper enhances identification and/or activates one or more security measures in the paper (e.g., a watermark, a light-activating embedded article, etc). Upon removing the paper-based form of payment, the sensor 110 senses such removal and facilitates deactivation (e.g., turning off) of the light sources (104, 106) either immediately or after a prescribed duration of time.

As disclosed in reference to FIGS. 1–3, the sensor 110 is a force sensitive sensor. As depicted in FIG. 3, the light transmissive support plate 108 is engaged with the sensor 110 and the light transmissive support plate is mounted on the housing 102 in a manner enabling force to be applied on the sensor 110 by the light transmissive support plate 108 when a corresponding force (e.g., placement of the paper-based form of payment) is applied on the light transmissive support plate 108. However, in other embodiments not specifically shown, it is disclosed herein that other type of sensors may be implemented. For example, a sensor that detects relatively abrupt changes in light intensity may be used for sensing when an article is being brought into position and/or placed on the light transmissive support plate 108. Additionally, the sensor 110 may be connected to other elements such as, for example, a relay or a timer.

There are a number of advantages associated with implementing a plurality of light sources (e.g., the first light source 104 and the second light source 106). One advantage is that, by spacing the light sources apart, uniformity of light distribution through the light transmissive support plate is enhanced. Another advantage is that a first one of the light sources may provide light of a first type (e.g., a type that is preferred with a first type of security measure) and a second one of the light sources may provide light of a second type (e.g., a type that is preferred with a second type of security measure). Where different types of light sources are implemented, the light transmissive support plate 108 may include means for diffusing light (e.g., a diffusing pattern on one or both major surfaces), whereby uniformity of light distribution through the light transmissive support plate is enhanced.

Figure 4:
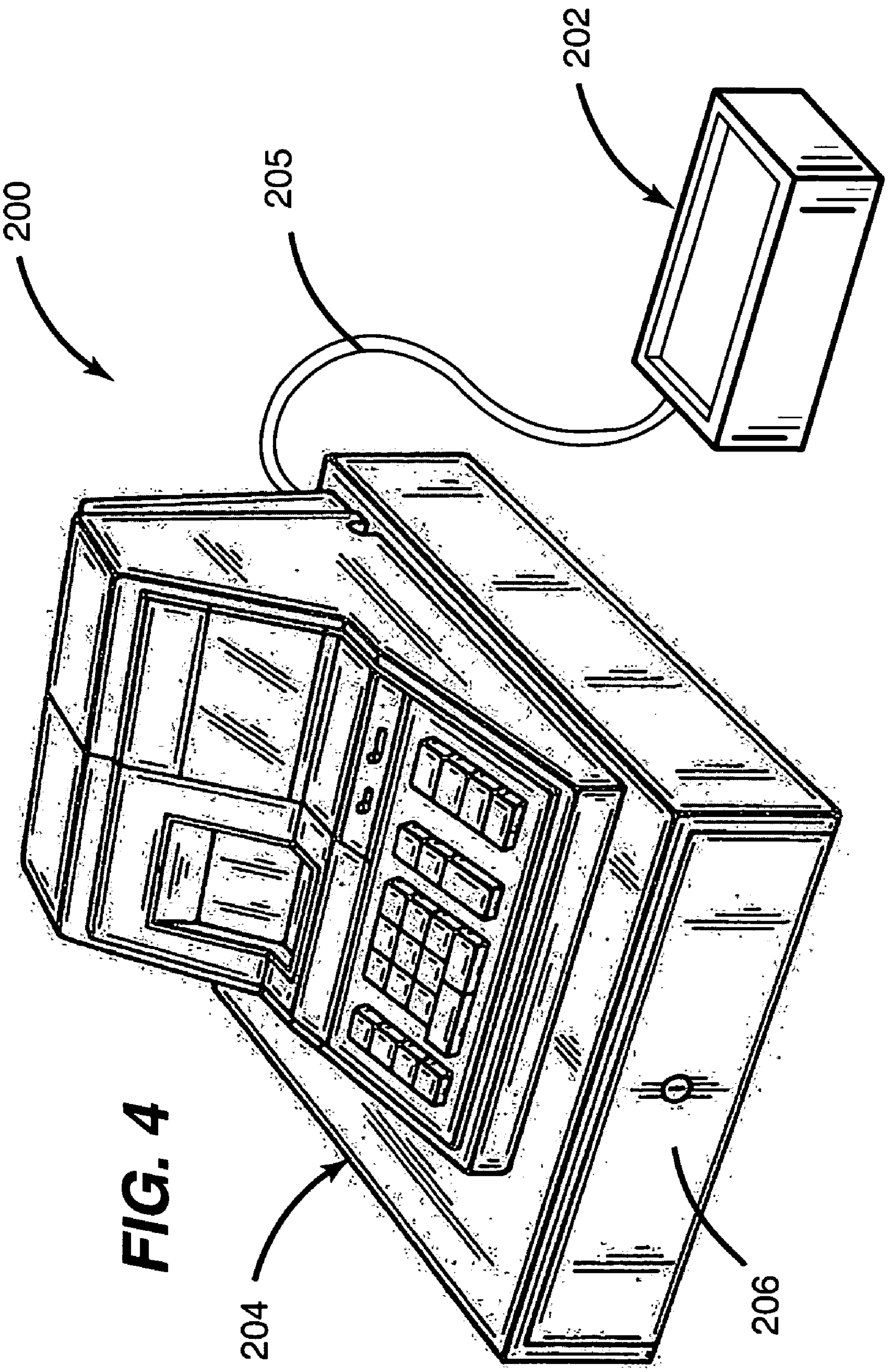
FIG. 4 depicts an embodiment of a sales system in accordance with the inventive disclosures made herein is depicted.

Referring now to FIG. 4, an embodiment of sales system 200 in accordance with the inventive disclosures made herein is depicted. The sales system 200 includes an illumination device 202 and a sales transaction processing unit 204 coupled to the illumination device 202 via interface cable 205. In one embodiment, the illumination device 202 has essentiality the same construction, elements and/or functionality as the illumination device 100 depicted in FIG. 1. The sales transaction processing unit 204 includes a means for activating the light source of the illumination device in response to a suitable action. Examples of such action include, but are not limited to, determining when a prescribed event of the sales transaction processing unit has been performed and receiving a signal designating that the prescribed event of the sales transaction processing unit has been performed.

In one embodiment, the prescribed event is opening of a payment drawer 206 of the sales transaction processing unit 204. A sensor (not specifically shown) detects such opening of the payment drawer and triggers activation of the illumination device 202 (i.e., turning on light sources of the illumination device 202). The sensor is configured for determining a relative position of the payment drawer 206. For example, a limit switch is mounted for detecting a closed and/or open position (i.e., a relative position) of the payment drawer 206. An alternate approach to use of a sensor for detecting such opening of the payment drawer 206 is for an algorithm that controls operation of the sales transaction processing unit 204 to output a signal upon facilitating opening of the payment drawer 206 (i.e., upon facilitating the prescribed event that triggers the illumination device 202).

It is disclosed herein that the means for activating the light source of the illumination device in response to the suitable action being performed may be comprised by an interface unit (not specifically shown). In one embodiment, the interface unit is integrated into the payment processing system 204. In another embodiment, the interface unit is integrated into the illumination device 202. In still another embodiment, the interface unit is a standalone unit that is coupled between the payment processing system 204 or the illumination device 202.

It is disclosed herein that, in another embodiment of the sales system 200, the illumination device 202 is mounted on the sales transaction processing unit 204 above the payment drawer 206 of the sales transaction processing unit 204. In this manner, a form of payment may be placed on the illumination device 202 and readily examined. In still another embodiment, the illumination device may be integral with the sales transaction processing unit 204 rather than being a separate unit.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice embodiments of the inventive disclosures made herein. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. An apparatus for enabling authentication of a paper-based form of payment, comprising:

an illumination device including a housing, a light source mounted within a cavity of the housing and a light transmissive support plate engaged with the housing, wherein the housing and the light source are configured for enabling light from the light source to impinge upon the light transmissive support plate, and illuminate the paper-based form of payment placed on the transmissive support plate to authenticate the paper based form of payment;

an interface unit coupled to the light source of the illumination device, wherein the interface unit is configured for activating the light source in response to at least one of determining when a prescribed event of a sales transaction processing unit has been performed and receiving a signal designating that the prescribed event of the sales transaction processing unit has been performed;

a force sensitive sensor configured for selectively activating the light source dependent upon placement of the paper-based form of payment on the light transmissive support plate and wherein the light transmissive support plate is engaged with the force sensitive sensor; and the light transmissive support plate is mounted in a manner enabling force to be applied on the force sensitive sensor by the light transmissive support plate when a corresponding force is applied on a support surface of the light transmissive support plate.

2. The apparatus of claim 1, wherein:

the prescribed event is opening of a payment drawer of the sales transaction processing unit;

the interface unit includes a sensor configured for determining a relative position of the payment drawer;

the illuminating device further includes a force sensitive sensor configured for selectively activating the light source dependent upon placement of the paper-based form of payment on the light transmissive support plate, and illuminate the paper-based form of payment placed on the transmissive support plate to authenticate the paper-based form of payment;

the light transmissive support plate is engaged with the force sensitive sensor; and the light transmissive support plate is mounted in a manner enabling force to be applied on the force sensitive sensor by the light transmissive support plate when a corresponding force is applied on a support surface of the light transmissive support plate.

3. A sales system, comprising:

an illumination device including a housing, a light source mounted within a cavity of the housing and a light transmissive support plate engaged with the housing, wherein the housing and the light source are configured for enabling light to impinge upon the light transmissive support plate, and illuminate the paper-based form of payment placed on the transmissive support plate to authenticate the paper based form of payment; and a sales transaction processing unit coupled to the illumination device and including mean for activating the light source of the illumination device in response to at least one of determining when a prescribed event of the sales transaction processing unit has been performed and receiving a signal designating that the prescribed event of the sales transaction processing unit has been performed;

a force sensitive sensor configured for selectively activating the light source dependent upon placement of the paper-based form of payment on the light transmissive support plate and wherein the light transmissive support plate is engaged with the force sensitive sensor; and the light transmissive support plate is mounted in a manner enabling force to be applied on the force sensitive sensor by the light transmissive support plate when a corresponding force is applied on a support surface of the light transmissive support plate.

4. The system of claim 3, wherein:

the prescribed event is opening of a payment drawer of the sales transaction processing unit;

the interface unit includes a sensor configured for determining a relative position of the payment drawer;

the illuminating device further includes a force sensitive sensor configured for selectively activating the light source dependent upon placement of the paper-based form of payment on relative to the light transmissive support plate;

the light transmissive support plate is engaged with the force sensitive sensor; and the light transmissive support plate is mounted in a manner enabling force to be applied on the force sensitive sensor by the light transmissive support plate when a corresponding force is applied on a support surface of the light transmissive support plate.

* * * * *